July 31, 1956  J. R. NELSON ET AL  2,756,596
COMPRESSOR TEMPERATURE SENSING SYSTEM
Filed March 14, 1952
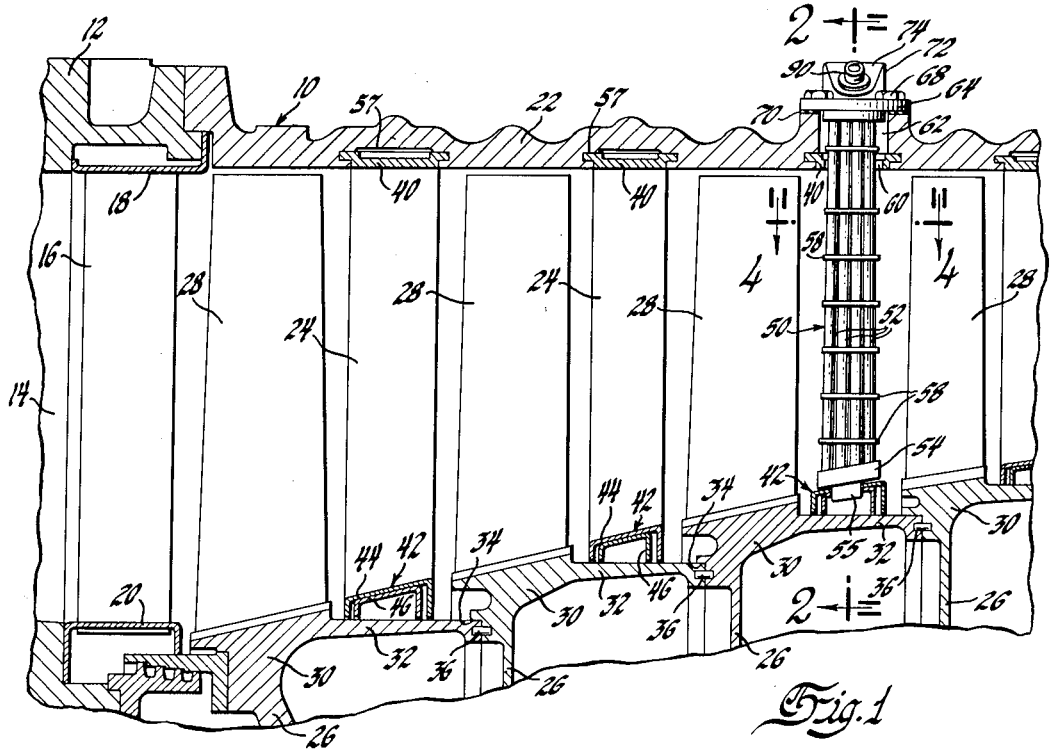
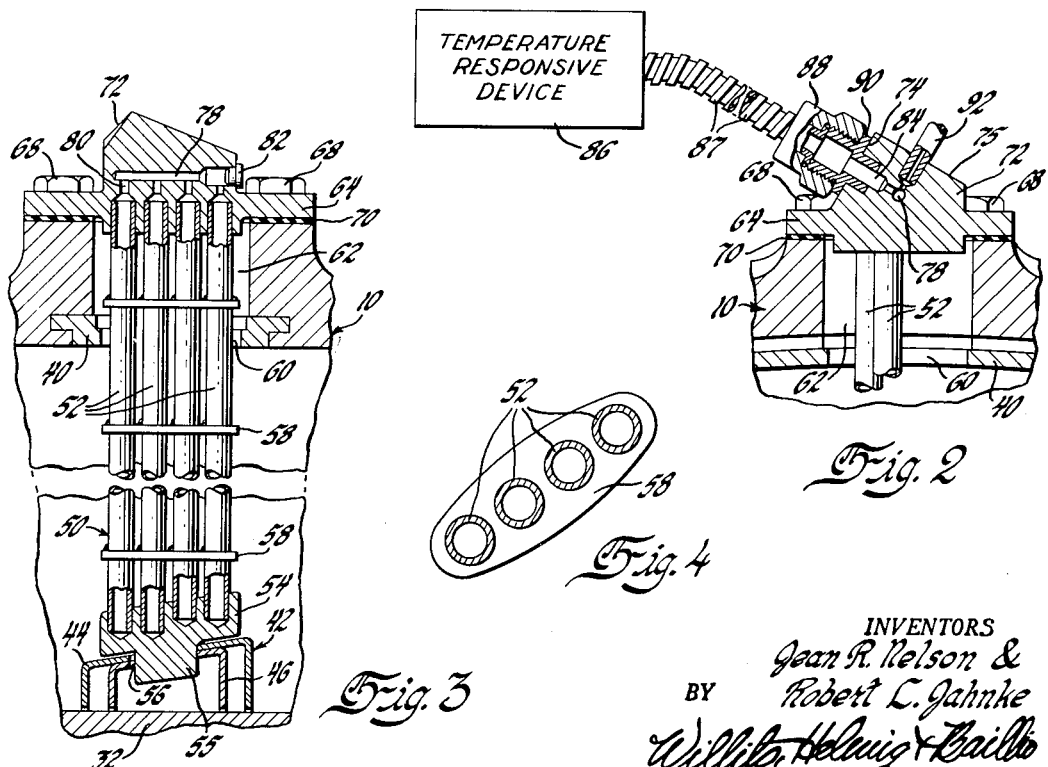
INVENTORS
Jean R. Nelson &
Robert L. Jahnke
BY
Willita Helwig & Bailla
ATTORNEYS

United States Patent Office 2,756,596
Patented July 31, 1956

2,756,596

COMPRESSOR TEMPERATURE SENSING SYSTEM

Jean R. Nelson and Robert L. Jahnke, Indianapolis, Ind., assignors to General Motors Corporation, Detroit, Mich., a corporation of Delaware Application March 14, 1952, Serial No. 276,644

10 Claims. (Cl. 73—343)

This invention relates to temperature sensing devices, and, more particularly, to an improved temperature sensing device for measuring temperatures within elastic fluid dynamic machines such as gas turbine engines and the like.

For fuel control and other allied purposes, it is essential, particularly in aircraft jet engine installations, to measure the temperature of air entering the engine. It has been found, however, that the placement of temperature sensing devices in the compressor inlet as has been customary is unsatisfactory due to icing conditions which prevent proper response to air temperature.

Our invention involves locating the temperature sensing element further downstream in the compressor beyond the icing zone. However, this has been found difficult to do without interfering with the air flow through the compressor owing to the complexity of the compressor structure and the limited space available therein.

Accordingly, the present invention has for its general object to provide an improved temperature sensing device for measuring the temperature of the air entering the compressor of a jet propulsion engine, and, more particularly, to provide such a device within the interior of the compressor without disturbing or interfering with the operation thereof. Other objects are to provide a simple and efficient temperature sensing device that is light in weight and sensitive and efficient in operation.

The preferred manner in which these and other objects of our invention are realized, together with the features and advantages attending the invention, will appear from the following detailed description and drawings wherein; Fig. 1 is a fragmentary sectional view taken in the plane of the axis of a multistage axial flow compressor employing temperature sensing means in accordance with the present invention; Fig. 2 is an enlarged fragmentary sectional view taken in the plane 2—2 of Fig. 1; Fig. 3 is an enlarged broken elevational view taken in the plane of the temperature sensing means of Fig. 1; and Fig. 4 is a sectional view taken in the plane 4—4 of Fig. 1.

Referring to the drawings, Fig. 1 is a partial longitudinal view of a multistage axial flow compressor 10 fitted to the forward frame 12 of a gas turbine jet engine. Only a portion of the forward frame and compressor are shown, the remainder of the engine being omitted in the interest of clarity of the drawings and conciseness of the specification, as the general structure of such engines is well known to those skilled in the art.

The forward frame 12 defines an annular passage 14 therein which serves as the inlet to the compressor. A row of inlet guide vanes 16 is mounted between outer and inner shroud rings 18 and 20 suitably secured to the discharge end of the forward frame. The compressor 10 comprises a generally cylindrical split casing 22 which mounts a number of rows of stator vanes 24 and encloses a rotor member defined by a number of axially spaced rotor disks 26 each having a number of rotor blades 28 mounted about the periphery thereof.

The rotor disks 26, which are mounted for rotation in known manner on stub shafts (not shown) journaled within the compressor casing, are each constituted by a thickened rim portion 30 and a spacing ring or flange 32 integrally formed therewith and extending rearwardly therefrom to engage a mating shoulder 34 formed in the forward end of the rim of a succeeding rotor disk. The rotor disks are coupled by a number of short dowel pins 36 extending between the edge of the spacing ring of one disk and the forward edge of the rim of a succeeding disk.

The stator vanes 24 of each stator stage are mounted in a split annular assembly which is supported from the compressor casing 22 and is composed of a pair of semi-cylindrical segments corresponding to the halves of the compressor casing. Each of the segments comprises an outer shroud band 40 and a double-channel inner shroud band 42, the latter comprising arcuate outer and inner channel members 44 and 46 having superimposed webs and inwardly extending flanges projecting in close proximity with the spacing ring 32 of a corresponding rotor disk for sealing. The outer shroud band 40 is mounted in a grooved recess 57 extending about the interior of the compressor casing.

In accordance with the preferred embodiment of the invention, the temperature of the air is measured by a temperature sensing bulb 50 the shape of which resembles, in general, that of a compressor stator vane 24 and which is substituted for one of the stator vanes, preferably in an early stage of the compressor. By way of example, temperature bulb 50 is shown located in the third stator stage of the compressor where the temperature is above the icing zone and is related to the temperature at the compressor inlet by a simple function. The bulb comprises a number of closely arranged thin-walled tubes 52 of a material of high heat conductivity such as copper, for example.

The tubes are approximately parallel, but are so arranged that the axes of the tubes conform approximately to the mean plane of a stator vane of the stage in which the bulb is located. In other words, the assembly is somewhat twisted to correspond to the twist of a blade, and the assembly is disposed at substantially the same angle to the compressor axis as a normal stator blade, so as to minimize disturbance of the air flow by both sides of the bulb.

The spacing of the tubes is shown more clearly in Fig. 3, which is projected on a plane parallel to the plane most closely conforming to the axes of the tubes.

The inner end of each tube 52 terminates and is sealed in an elliptical-shaped foot 54 having an integrally formed root or tenon 55 extending inwardly therefrom and adapted for mounting in an opening 56 in the inner shroud band 42. The tubes are reinforced and maintained in axially spaced relation by a plurality of spaced fins 58 (Figs. 3 and 4) which also improve the heat transfer. The fins 58 are substantially elliptical members having a number of spaced openings for the tubes 52 which extend therethrough and are soldered or otherwise secured thereto.

The tubes 52 extend radially from the foot 54 of the bulb through an opening 60 in the outer shroud band 40 and an aligned opening 62 in the compressor casing 10 where they terminate in a header 64 fastened to the casing 22 by cap screws 68. A gasket 70 is provided between the casing and header. The bulb assembly may be inserted through the opening in the casing and piloted into the opening 56 in the inner shroud ring, and then be secured to the casing by the cap screws 68.

As shown in Fig. 2, the header 64 has an integrally formed cylindrical boss 72 extending outwardly therefrom, the boss having oblique faces 74, 75 formed in the outer surface thereof. A central passage or manifold 78 extending partially through the interior of the boss communicates by branch passages 80 with the outer ends of the tubes 52, the outer end of the passage 78 being sealed by a plug 82 that is welded or otherwise sealed in place.

The header 64 contains a second passage 84 (Fig. 2) extending obliquely from the central manifold passage 78 and through the face 74 of the boss 72 which passage is connected to a conventional temperature responsive device 86 through a length of flexible tubing 87 having a standard fitting 88 at its end adjacent the header. The fitting connects to a nipple 90 that is welded in a recess in the face 74 of the boss so as to constitute an extension of the passage 84.

For the purpose of evacuating and filling the system of Fig. 2 after it is connected to the responsive device, a filler tube 92 is provided extending through the face 75 of the header into the central manifold passage 78 as shown. After the air is evacuated from the system, a thermosensitive medium such as a volatile fluid like glycerine, for example, is introduced into the system and the filler tube 92 is then sealed.

Depending upon the particular application, the temperature responsive device 86 may be any conventional apparatus such, for example, as a pressure gauge calibrated in terms of temperature or a bellows-actuated valve forming a part of an automatic fuel control system, as is known to those skilled in the art.

The invention thus advantageously presents a simple and efficient structure whereby the temperature of the air entering the compressor may be quickly and accurately measured. By placing the bulb beyond the icing zone, the adverse effect of icing is eliminated. Since the temperature sensing tubes extend completely across the path of the air flow through the compressor, the invention enables the measurement of the integrated average temperature in the region of a plane transverse to the axis of the invention, whereby an accurate measurement of the true temperature within the compressor is obtained. By mounting the bulb in the position of a stator vane and by further proportioning the bulb so that its outline conforms generally with the shape of a stator vane, negligible disruption of the air flow through the compressor is caused thereby. Since the air flow is across both sides of the tubes of the bulb, good heat transfer and rapid response characteristic are presented thereby.

Although the invention has been shown embodied in a compressor, this arrangement is but illustrative of the application of the principles of the invention. Numerous other arrangements may be devised by those skilled in the art without departing from the spirit and scope of the invention.

We claim:

1. In combination, a stator comprising a casing, a rotor mounted for rotation within said casing, at least one stator stage comprising a plurality of stator vanes supported from said casing, and means for measuring the temperature within said casing comprising a temperature sensing device mounted in the position of one of said stator vanes of said stator stage, the shape of said temperature sensing device conforming generally to that of a stator vane replaced thereby.

2. In combination, an elastic fluid dynamic machine comprising a stator and a rotor member, said stator comprising a casing surrounding said rotor member and at least one stator stage including a plurality of stator vanes supported from said casing, and means for measuring the temperature within said casing comprising a temperature sensing device substituted for and mounted in the position of one of the stator vanes of said stator stage, said temperature sensing device comprising a plurality of spaced tubes extending across the path of fluid flow through said machine and collectively conforming generally to the shape of a stator vane replaced thereby.

3. In an elastic fluid machine comprising a stator and rotor member, said stator member comprising a casing surrounding said rotor member and a plurality of rows of stator vanes supported from said casing, means for measuring the temperature within said casing comprising a temperature bulb mounted in the position of one of the stator vanes in one of said stator rows, said bulb comprising a plurality of spaced tubes extending across the path of fluid flow through said machine, said tubes being disposed so that the axes of the tubes correspond approximately to the mean plane of a stator vane replaced thereby, a temperature responsive device, and means for connecting said temperature bulb to a temperature responsive device.

4. In an axial flow compressor having a plurality of axially spaced intercalated rows of stator vanes and rotor blades, means for measuring the temperature within said compressor comprising a temperature sensing device mounted in the position of a stator vane, the shape of said temperature sensing device conforming generally to that of a stator vane replaced thereby.

5. In combination, a stator including a casing, a rotor mounted for rotation within said casing, said stator and rotor having a plurality of axially spaced intercalated rows of stator vanes and rotor blades thereon, and means for measuring the temperature within said casing comprising a temperature sensing device mounted in the position of one of said stator vanes, the shape of said temperature sensing device conforming generally to that of a stator vane with the axial plane of said device conforming generally to the mean plane of a stator vane replaced thereby.

6. A temperature sensing device conforming generally to the shape of a blade of an axial flow compressor and comprising a plurality of closely spaced tubes filled with a thermosensitive medium, the axes of said tubes lying in a curved surface that is twisted substantially along the length of said tubes, a plurality of radiating support fins common to each of said tubes and spaced along the length thereof, header means forming a support for said temperature sensing device and containing a common passage therein connecting said tubes in parallel, a root member spaced from said header means and forming another support for said temperature sensing device, one end of each of said tubes terminating in and being supported by said header means and the other end being sealed and supported in said root member, a temperature responsive device, and means extending between said temperature responsive device and said header means for connecting said temperature responsive device thereto.

7. In an elastic fluid dynamic machine having a stator and rotor member, said stator member including a casing surrounding said rotor member and a plurality of axially spaced stator stages, each of said stator stages including an outer shroud band mounted in said casing, an inner shroud band and a number of stator vanes mounted between said outer and inner shroud bands, means for measuring the temperature within said casing comprising a temperature sensing device substituted for one of said stator vanes of one of said stator stages and a temperature responsive device to be actuated by said temperature sensing device, said temperature sensing device comprising a plurality of closely spaced small bore tubes containing a thermo-sensitive medium, a foot for mounting said temperature sensing device in said inner shroud band, a header mounted on said casing, one end of each of said tubes terminating in said foot in said inner shroud band and the other end extending through an enlarged opening in said outer shroud band and said casing into said header, said header containing a common passage communicating with each of said tubes and an auxiliary passage communicating with said common passage and connecting means extending between said auxiliary passage in said header and said temperature responsive device.

8. In combination with a gas turbine aircraft engine having a multi-stage axial flow compressor the temperature at the inlet of which may be in the icing range during flight operations, said compressor including a stator casing and a rotor rotatable in said casing, said stator and rotor having a plurality of axially spaced intercalated rows of stator vanes and rotor blades therein, means for obtaining a measure of the temperature of air entering said compressor comprising a temperature bulb mounted in the position of one of said stator vanes in one of the early stages of the compressor where the temperature is above said icing range, said temperature bulb including a plurality of spaced tubes disposed in the path of fluid flow through said compressor and being shaped to conform generally to the shape of a stator vane replaced thereby.

9. In an elastic fluid machine including a stator and rotor member, said stator member including a casing surrounding said rotor member and a plurality of stator stages each having a plurality of stator vanes therein, means for measuring the integrated average temperature within said casing comprising a temperature bulb mounted in the position of one of the stator vanes in one of said stator rows, said bulb comprising a plurality of closely spaced tubes connected in parallel and filled with a thermosensitive medium, said tubes extending across the path of fluid flow through said machine and collectively conforming generally to the shape of a stator vane replaced thereby.

10. In combination, a gas turbine aircraft engine having a multi-stage axial flow compressor including a stator and rotor member, said stator member including a casing surrounding said rotor member and a plurality of axially spaced stages of stator vanes mounted from said casing, and means for measuring the temperature of air entering said compressor where the temperature may be in the icing range, said temperature measuring means comprising a temperature bulb mounted in the position of the stator vanes in one of the early stator stages of said compressor where the temperature is above the icing range, the shape of said temperature bulb conforming generally to the shape of a stator vane.

References Cited in the file of this patent

UNITED STATES PATENTS

| | | |
|---|---|---|
| 1,233,480 | Jacobus | July 17, 1917 |
| 1,286,096 | Powers | Nov. 26, 1918 |
| 1,326,957 | Norwood | Jan. 6, 1920 |
| 1,442,574 | Johnson | Jan. 16, 1923 |
| 2,688,844 | McLeod et al. | Sept. 14, 1954 |

FOREIGN PATENTS

| | | |
|---|---|---|
| 349,304 | Germany | Feb. 27, 1922 |
| 621,790 | Great Britain | Apr. 20, 1949 |
| 265,056 | Great Britain | Feb. 3, 1927 |
| 113,867 | Sweden | Apr. 24, 1945 |